US011961072B2

(12) United States Patent
Li et al.

(10) Patent No.: US 11,961,072 B2
(45) Date of Patent: *Apr. 16, 2024

(54) TECHNIQUES FOR CONDUCTING TRANSACTIONS UTILIZING CRYPTOCURRENCY

(71) Applicant: Visa International Service Association, San Francisco, CA (US)

(72) Inventors: Xi Li, Geylang (SG); Wen Zhao Cheng, Singapore (SG); Jun Ryan Menorca Tagama, Lucena (PH); Satrajit Ray, Hedges Park Condo (SG); Gabriel Jin Juan Ang, The Santorini (SG); Lavanya Rengarajan, Singapore (SG)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,544

(22) Filed: Sep. 30, 2021

(65) Prior Publication Data
US 2022/0020011 A1 Jan. 20, 2022

Related U.S. Application Data

(63) Continuation of application No. 15/870,574, filed on Jan. 12, 2018, now Pat. No. 11,164,181.

(51) Int. Cl.
*G06Q 20/38* (2012.01)
*G06Q 20/06* (2012.01)
(Continued)

(52) U.S. Cl.
CPC ....... *G06Q 20/3823* (2013.01); *G06Q 20/065* (2013.01); *G06Q 20/10* (2013.01);
(Continued)

(58) Field of Classification Search
CPC .. G06Q 20/3823; G06Q 20/065; G06Q 20/10; G06Q 20/227; G06Q 20/381; G06Q 20/40; G06Q 20/401; H04L 2209/56
See application file for complete search history.

(56) References Cited

U.S. PATENT DOCUMENTS 10,055,715 B1 8/2018 Grassadonia et al.
10,269,009 B1 4/2019 Winklevoss et al.
(Continued)

FOREIGN PATENT DOCUMENTS

JP 09311891 A 12/1997

OTHER PUBLICATIONS

U.S. Appl. No. 15/870,574 , "Final Office Action", dated Apr. 9, 2020, 27 pages.
(Continued)

*Primary Examiner* — Jamie R Kucab
(74) *Attorney, Agent, or Firm* — Kilpatrick Townsend & Stockton LLP

(57) ABSTRACT

Embodiments of the invention are directed to systems and methods for conducting a transaction utilizing a cryptocurrency. The user may fund a cryptocurrency account with his pre-existing cryptocurrency. An issuer may purchase cryptocurrency within a cryptocurrency exchange. The user may then utilize a payment device (e.g., a Crypto Debit Card) that is associated with a cryptocurrency balance to conduct a transaction with a merchant for goods and/or services. An authorization request message may be transmitted to the authorizing entity computer. The authorizing entity computer may determine a cryptocurrency amount corresponding to the fiat currency transaction amount of the authorization request message. A sell request message may be transmitted to an exchange that facilitates the sale of the cryptocurrency amount. If the sale is successful, the autho-
(Continued)

rizing entity computer may transmit an authorization response message indicating that the transaction is approved and the merchant may release the purchased goods and/or services.

20 Claims, 12 Drawing Sheets

(51) Int. Cl.
G06Q 20/10 (2012.01)
G06Q 20/22 (2012.01)
G06Q 20/40 (2012.01)
(52) U.S. Cl.
CPC ......... *G06Q 20/227* (2013.01); *G06Q 20/381* (2013.01); *G06Q 20/40* (2013.01); *G06Q 20/401* (2013.01); *H04L 2209/56* (2013.01)

(56) References Cited

U.S. PATENT DOCUMENTS

| | | | |
|---|---|---|---|
| 10,354,325 | B1 | 7/2019 | Skala et al. |
| 10,817,853 | B1 | 10/2020 | Brock et al. |
| 2004/0148255 | A1 | 7/2004 | Beck et al. |
| 2005/0146966 | A1* | 7/2005 | Kawamura ............ G06F 21/105 365/222 |
| 2009/0076884 | A1* | 3/2009 | Johnson ................. G06Q 40/06 705/320 |
| 2010/0306096 | A1* | 12/2010 | Gorman ................. G06Q 40/04 705/37 |
| 2012/0191817 | A1* | 7/2012 | Sayan ................. G06Q 30/0639 709/219 |
| 2015/0032595 | A1* | 1/2015 | Koo ........................ G06Q 40/04 705/37 |
| 2015/0262168 | A1 | 9/2015 | Armstrong |
| 2015/0332256 | A1* | 11/2015 | Minor ....................... H04L 9/50 705/69 |
| 2015/0332395 | A1 | 11/2015 | Walker et al. |
| 2015/0363770 | A1 | 12/2015 | Ronca et al. |
| 2016/0203477 | A1* | 7/2016 | Yang ................. G06Q 20/3829 705/69 |
| 2016/0253710 | A1 | 9/2016 | Publicover et al. |
| 2016/0328662 | A1* | 11/2016 | Vinod ................. G06F 16/2291 |
| 2017/0132621 | A1 | 5/2017 | Miller et al. |
| 2017/0161734 | A1 | 6/2017 | Bankston et al. |
| 2017/0221053 | A1 | 8/2017 | Goloshchuk |
| 2018/0075453 | A1* | 3/2018 | Durvasula .......... G06Q 20/3678 |
| 2018/0075527 | A1 | 3/2018 | Nagla et al. |
| 2018/0189732 | A1* | 7/2018 | Kozloski ................... G06F 8/71 |
| 2019/0034936 | A1 | 1/2019 | Nolan et al. |

OTHER PUBLICATIONS

U.S. Appl. No. 15/870,574 , "Final Office Action", dated Feb. 10, 2021, 35 pages.
U.S. Appl. No. 15/870,574 , "Non-Final Office Action", dated Sep. 4, 2020, 24 pages.
U.S. Appl. No. 15/870,574 , "Non-Final Office Action", dated Nov. 18, 2019, 26 pages.
U.S. Appl. No. 15/870,574 , "Notice of Allowance", dated Jul. 12, 2021, 14 pages.
CVETKOVA , "Cryptocurrencies Legal Regulation", BRICS Law Journal, vol. V, Issue 2, 2018, pp. 128-153.
PCT/US2018/055362 , "International Preliminary Report on Patentability", dated Jul. 23, 2020, 9 pages.
PCT/US2018/055362 , "International Search Report and Written Opinion", dated Feb. 1, 2019, 12 pages.

\* cited by examiner

| ISSUER | EXCHANGE | TRANSACTION AMOUNT (USD) | BITCOIN AMOUNT | TRANSACTION TIME |
|---|---|---|---|---|
| DDS | Coin BB | 1000 | 0.51 | 2017-05-18 00:02:13 |
| DDS | Coin BB | 2000 | 1.2 | 2017-05-18 23:12:13 |
| DDS | Coin EE | 3000 | 1.7 | 2017-05-18 02:02:13 |
| DDC | Coin BB | 1000 | 0.52 | 2017-05-18 07:02:13 |
| DDS | Coin BB | 4000 | 1.9 | 2017-05-18 08:02:13 |
| DDA | Coin CC | 500 | 0.25 | 2017-05-18 12:02:13 |

*FIG. 6*

TECHNIQUES FOR CONDUCTING TRANSACTIONS UTILIZING CRYPTOCURRENCY

CROSS-REFERENCES TO RELATED APPLICATIONS

This application is a Continuation Application of U.S. patent application Ser. No. 15/870,574, filed on Jan. 12, 2018, which is herein incorporated by reference in its entirety for all purposes.

BACKGROUND

A transaction to transfer cryptocurrency between two parties may utilize a cryptocurrency network of computers that jointly manage an electronic ledger of transactions. The process for confirming the transaction within the cryptocurrency network may take a substantial time to complete. Accordingly, it is impractical to utilize a cryptocurrency network to perform transactions that require confirmation in a relatively short period of time. Additionally, both parties to the transaction are required to have an account within the cryptocurrency network before a transfer may occur. Thus, conventional systems may be improved with respect to latency and accessibility.

Embodiments of the invention address these and other problems individually and collectively.

SUMMARY

One embodiment of the invention is directed to a method. The method comprising receiving, by an authorizing entity computer, an authorization request message associated with a transaction having a fiat currency amount. The method further comprising determining, by the authorizing entity computer, that the authorization request message indicates utilization of a cryptocurrency wallet account. The method further comprising obtaining, by the authorizing entity computer, an exchange rate associated with a cryptocurrency corresponding to the cryptocurrency wallet account. The method further comprising transmitting, by the authorizing entity computer, a sell request message that indicates a sell request for a cryptocurrency amount based at least in part on the fiat currency amount and the exchange rate associated with the cryptocurrency. The method further comprising receiving, by the authorizing entity computer, a sell response message indicating that the sell request was successful. The method further comprising transmitting, by the authorizing entity computer, an authorization response message associated with the authorization request message, the authorization response message indicating that the transaction is authorized.

Another embodiment of the invention is directed to an authorizing entity computer comprising a processor and a computer readable medium. The computer readable medium comprising code, executable by the processor, for implementing the above-described method.

Another embodiment of the invention is directed to a method. The method comprising receiving, by a processing network computer, an authorization request message associated with a transaction having a fiat currency amount. The method further comprising transmitting, by the processing network computer, the authorization request message to an authorizing entity computer. The method further comprising obtaining, by the processing network computer, an exchange rate associated with a cryptocurrency. The method further comprising receiving, by the processing network computer, a sell request message indicating a sell request for a cryptocurrency amount, the cryptocurrency amount being based at least in part on the fiat currency amount and the exchange rate associated with the cryptocurrency. The method further comprising transmitting, by the processing network computer, the sell request message to an exchange computer. The method further comprising receiving, by the processing network computer, a sell response message indicating that the sell request was successful. The method further comprising maintaining, by the processing network computer, information related to the sell response message in an electronic ledger. The method further comprising transmitting, by the processing network computer, the sell response message to the authorizing entity computer, wherein transmitting the sell response message causes the authorizing entity computer to transmit an authorization response message indicating that the transaction is authorized.

Further details regarding embodiments of the invention can be found in the Detailed Description and the Figures.

BRIEF DESCRIPTION OF THE DRAWINGS

FIG. 6 shows an exemplary ledger utilized for settlement according to an embodiment of the invention.

DETAILED DESCRIPTION

Figure 1:
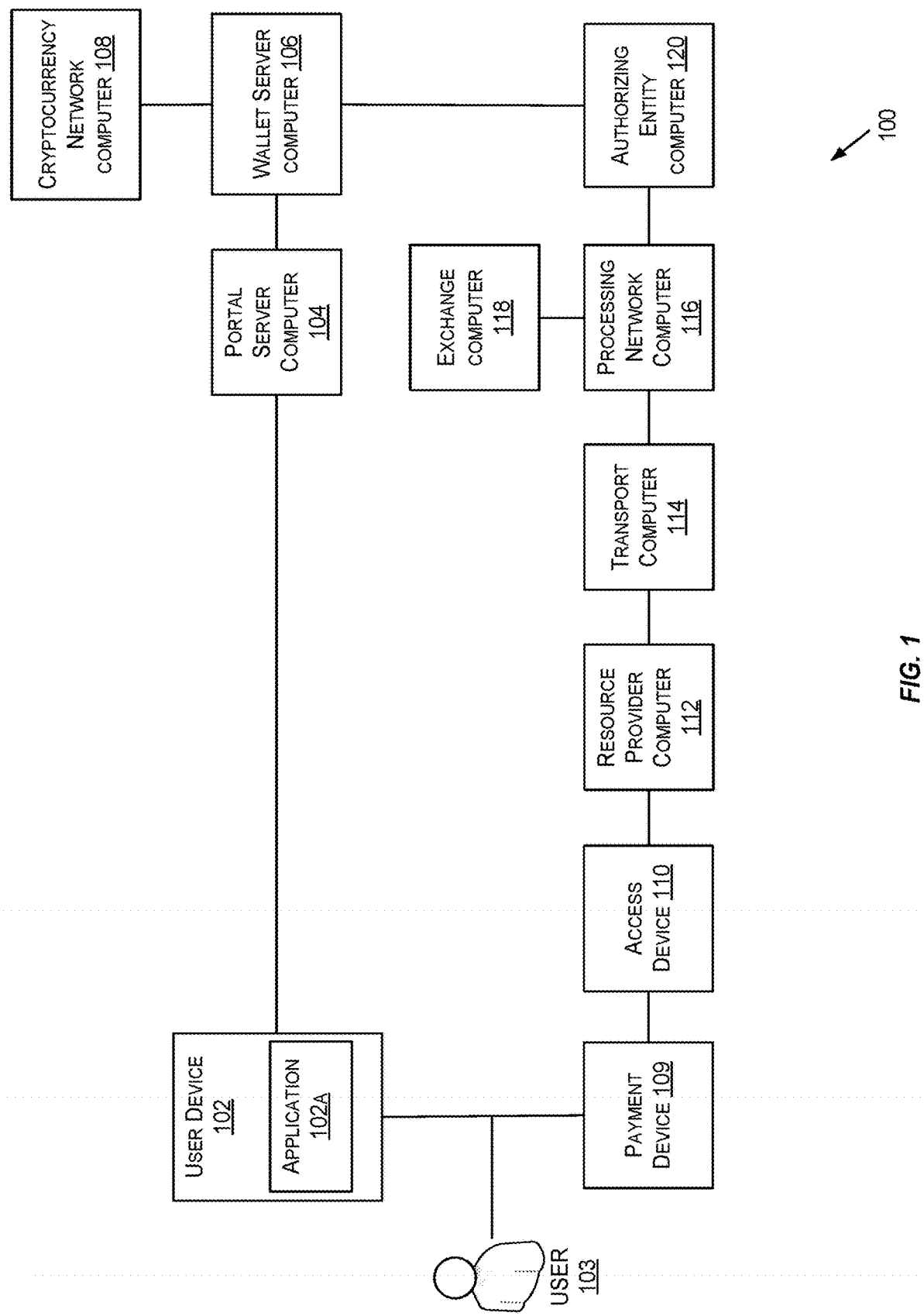
FIG. 1 shows a block diagram of a system for performing a transaction utilizing cryptocurrency.

Embodiments of the present invention are directed to conducting transactions for the exchange of goods and/or services utilizing cryptocurrency. Although examples herein may utilize a particular cryptocurrency for illustrative purposes, it should be appreciated that such examples may utilize any suitable cryptocurrency including, but not limited to, Bitcoin, Litecoin, Ethereum, Zcash, Dash, Ripple, and Monero. Initially, a user may access a website hosted by an authorizing entity to create a cryptocurrency account that may be associated with a payment device (e.g., a debit card). The user may transfer pre-existing cryptocurrency (e.g., Bitcoin) into the cryptocurrency account and the authorizing entity may manage the cryptocurrency account on behalf of the user. Separately, the authorizing entity may execute a process to purchase an amount of cryptocurrency utilizing an exchange that facilitates the purchase and sale of cryptocurrency between parties of the exchange. The exchange may operate separate from a cryptocurrency network that traditionally manages transfers of cryptocurrency between parties. The exchange may maintain the purchased cryptocurrency within an exchange account on behalf of the authorizing entity. Once the user has funded his cryptocurrency account, and the authorizing entity has cryptocurrency within its exchange account, a transaction for goods and/or services may be conducted utilizing cryptocurrency.

By way of example, the user can present a payment device (e.g., a debit card) at an access device to initiate a transaction. An authorization request message including payment credentials of the user (e.g., a debit card number, a payment account number, etc.) and indicating a transaction amount in fiat currency may be transmitted to an authorizing entity computer in the conventional manner. Upon receipt of the authorization request message, the authorizing entity computer may determine that the payment device indicated in the authorization request message is associated with a cryptocurrency account. The authorizing entity may ascertain the cryptocurrency account balance of the user, determine a cryptocurrency amount that is equivalent to the fiat currency amount (e.g., based on a current exchange rate of the cryptocurrency) included in the authorization request message, and request, via a processing network computer, that the cryptocurrency exchange sell the corresponding cryptocurrency amount within the exchange. If the exchange is successful in facilitating a sale of the requested cryptocurrency amount, the exchange may transfer the sold cryptocurrency to the exchange account of the buyer, and the fiat currency of the buyer to the exchange account of the authorizing entity. The exchange may communicate its success to the authorizing entity via the processing network computer. Once the authorizing entity has been notified of the successful sale, the authorizing entity may transmit a traditional authorization response message indicating that the original transaction is authorized. At a later time, the processing network computer may perform a settlement process to between financial institutions (e.g., a financial institution managing an account on behalf of the merchant and the Issuer). The payment processing network computer may additionally perform a settlement process between the Issuer and the exchange.

Existing mechanisms for transferring cryptocurrency can take a substantial period of time to complete due to the inherent latency of cryptocurrency networks. Thus, even if two parties wanted to exchange goods and/or services for cryptocurrency, both parties had (or created) a cryptocurrency account within the cryptocurrency network, and the parties performed a transfer, the transfer of the cryptocurrency could not be performed in near real-time. Thus, the inherent latency issues of conventional cryptocurrency networks make performing transactions with cryptocurrency impractical. By utilizing the techniques described herein, a user may perform a transaction in a traditional manner (e.g., by entering his debit card number, by swiping the debit card, etc.). To the other party (e.g., the merchant), the transaction occurs in the same manner as a fiat currency transaction. In fact, the merchant may be oblivious to the eventual usage of cryptocurrency entirely. Additionally, the techniques provided herein allow for the transaction to complete in near real-time, making the use of cryptocurrency to conduct a transaction far more practical.

Prior to discussing specific embodiments of the invention, some terms may be described in detail.

A "user device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single user device).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a cryptocurrency amount, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. If the payment device is in the form of a debit, credit, or smartcard, the payment device may also optionally have features such as magnetic stripes. Such devices can operate in either a contact or contactless mode. In some embodiments, a mobile device can function as a payment device (e.g., a mobile device can store and be able to transmit payment credentials for a transaction).

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g. memory element or secure element) that may be executable by a processor to complete a task.

A "user" may include an individual. In some embodiments, a user may be associated with one or more personal accounts and/or mobile devices. The user may also be referred to as a cardholder, account holder, or consumer.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

A "digital wallet" may contain electronic information for conducting transactions. A digital wallet may store user profile information, payment credentials, bank account information, cryptocurrency account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank, that issues a digital wallet to a user that enables the user to conduct financial transactions. A digital wallet provider may provide standalone user-facing software applications that store account numbers on behalf of a cardholder (or other user) to facilitate payments at more than one unrelated merchant, perform person-to-person payments, or load financial value into the digital wallet. A digital wallet provider may enable a user to access its account via a personal computer, mobile device or access device. Additionally, a digital wallet provider may also provide one or more of the following functions: storing one or more payment cards, maintaining one or more cryptocurrency accounts, storing other information including billing address, shipping addresses, and transaction history, initiating a transaction by one or more methods, such as providing a user name and password, NFC or a physical token, and may facilitate pass-through or two-step transactions.

An "exchange" may be an entity that facilitates exchanges of cryptocurrency and fiat currency between parties. The exchange may manage any suitable number of accounts associated with registered parties. Users that with to sell cryptocurrency may conduct a cryptocurrency transaction to transfer their cryptocurrency to the exchange and the exchange may manage the cryptocurrency on behalf of the user. Users may additionally, or alternatively, transfer fiat currency to the exchange and the exchange may manage the users' fiat currency within the exchange. A user may provide the exchange a "buy request" indicating that the user wishes to purchase a particular amount of cryptocurrency for a particular amount (or within a range of the particular amount) of fiat currency. Users may also provide the exchange a "sell request" indicating that the user wishes to sell cryptocurrency for a particular amount (or within a range of the particular amount) of fiat currency. The exchange may be configured to match a buy requests to a sell request in order to identify a buyer that is willing to purchase cryptocurrency at the fiat currency amount (or within the range) at which the seller is interested in selling. If a match is found, the exchange can facilitate a transfer of the fiat currency from the buyer's account within the exchange to the seller's account within the exchange. The exchange can also facilitate the transfer of the cryptocurrency from the seller's account within the exchange to the buyer's account within the exchange.

A "cryptocurrency network" may include a one or more computers that participate in maintaining a cryptocurrency ledger. In some cryptocurrency networks, the distributed cryptocurrency ledger may comprise a blockchain. A "blockchain" is a decentralized and distributed digital ledger that is used to record transactions across many computers so that the record cannot be altered retroactively without the alteration of all subsequent blocks and the collusion of the network. Examples of a cryptocurrency network may include networks of computers that manage any suitable cryptocurrency including, but not limited to, Bitcoin, Litecoin, Ethereum, Zcash, Dash, Ripple, and Monero.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

FIG. 1 shows a block diagram of a system 100 for performing a transaction utilizing cryptocurrency. The system 100 comprises a number of components. The system 100 may comprise a user device 102 which may be associated with a user 103, a portal server computer 104, a wallet server computer 106, a cryptocurrency network computer 108, a payment device 109 associated with the user 103, an access device 110, a resource provider computer 112, a transport computer 114, a processing network computer 116, an exchange computer 118, and an authorizing entity computer 120.

The user device 102, the portal server computer 104, the wallet server computer 106, the cryptocurrency network computer 108, the payment device 109, the access device 110, the resource provider computer 112, the transport computer 114, the processing network computer 116, the exchange computer 118, and the authorizing entity computer 120 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The user 103 may be able to use the user device 102 to create and/or manage a cryptocurrency account. By way of example, the user 103, utilizing application 102A operating on the user device 102 may access a website hosted by the portal server computer 104. In some embodiments, the portal server computer 104 may be configured to host a website on behalf of an authorizing entity (e.g., an Issuer of the payment device 109). Through the application 102A (e.g., a wallet application, a browser application, etc.), the portal server computer 104 may provide any suitable number of interfaces to enable the user 103 to create a cryptocurrency account and/or to modify an existing cryptocurrency account. The portal server computer 104 may receive information of the user (e.g., a cryptocurrency amount, a cryptocurrency network identifier associated with the user, etc.) and provide such information to the wallet server computer 106. The portal server computer 104 may be further configured to receive cryptocurrency account information (e.g., a cryptocurrency account balance provided by the wallet server computer 106) and provide such information on the website for viewing by the user 103.

Figure 2:
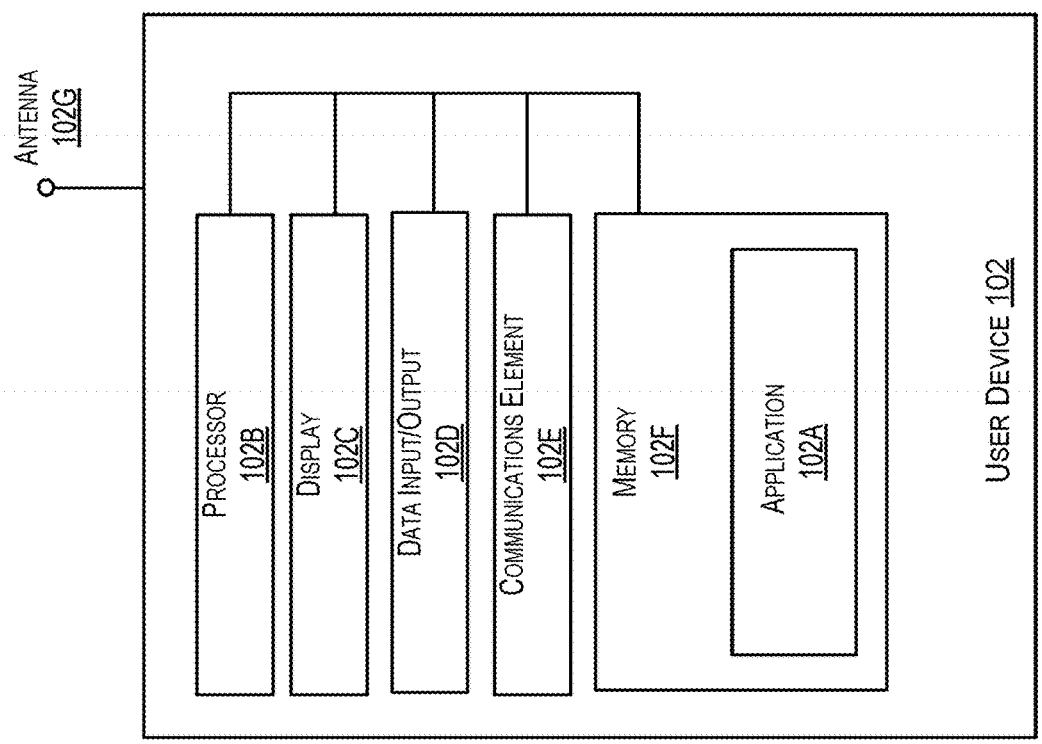
FIG. 2 shows a block diagram of an exemplary user device according to an embodiment of the invention.

An example of the user device 102 according to an embodiment of the invention, is shown in FIG. 2. In some embodiments, user device 102 may include circuitry that is used to enable certain device functions, such as telephony. The functional elements responsible for enabling those functions may include a processor 102B that can execute instructions that implement the functions and operations of the device. Processor 102G may access the memory 102F (or another suitable data storage region or element) to retrieve instructions or data used in executing the instructions, such as provisioning scripts and mobile applications. Data input/output elements 102D, such as a keyboard or touchscreen, may be used to enable a user to operate the user device 102 and input data. Data input/output elements may also be configured to output data (via a speaker of the device, for example). Display 102C may also be used to output data to a user. Communications element 102E may be used to enable data transfer between user device 102 and a wired or wireless network (via antenna 102G, for example) to assist in connectivity to the Internet or other network, and enabling data transfer functions.

In some embodiments, user device 102 may also include contactless element interface to enable data transfer between contactless element (not shown) and other elements of the device, where contactless element may include a secure memory and a near field communications data transfer element (or another form of short range communications technology). A cellular phone or similar device is an example of a user device 102 that may be used in accordance with embodiments of the present invention. However, other forms or types of devices may be used without departing from the underlying concepts of the invention. For example, the user device 102 may alternatively be in the form of a payment card, a key fob, a PDA, a tablet computer, a net book, a laptop computer, a smart watch, an automobile with remote capabilities, etc.

The memory 102F may comprise an application 102A and/or any other suitable module or data. The user device 102 may have any number of mobile applications installed or stored on the memory 102F and is not limited to that shown in FIG. 2. The memory 102F may also comprise code, executable by the processor 102B for implementing the methods discussed herein.

The application 102A (e.g., a digital wallet application, a browser application, etc.) may be configured to render at least one user interface provided by the portal server computer 104. The application 102A may, in some examples, be configured to access one or more Internet websites (e.g., associated with a cryptocurrency account, associated with an Issuer, etc.) to provide input and initiate, facilitate, and manage cryptocurrency account transactions. In some embodiments, application 102A may be configured to access a website associated with and/or provided by the portal server computer 104, the wallet server computer 106, the resource provider computer 112, the authorizing entity computer 120, the transport computer 114, the processing network computer 116, or any other suitable entity.

Figure 3:
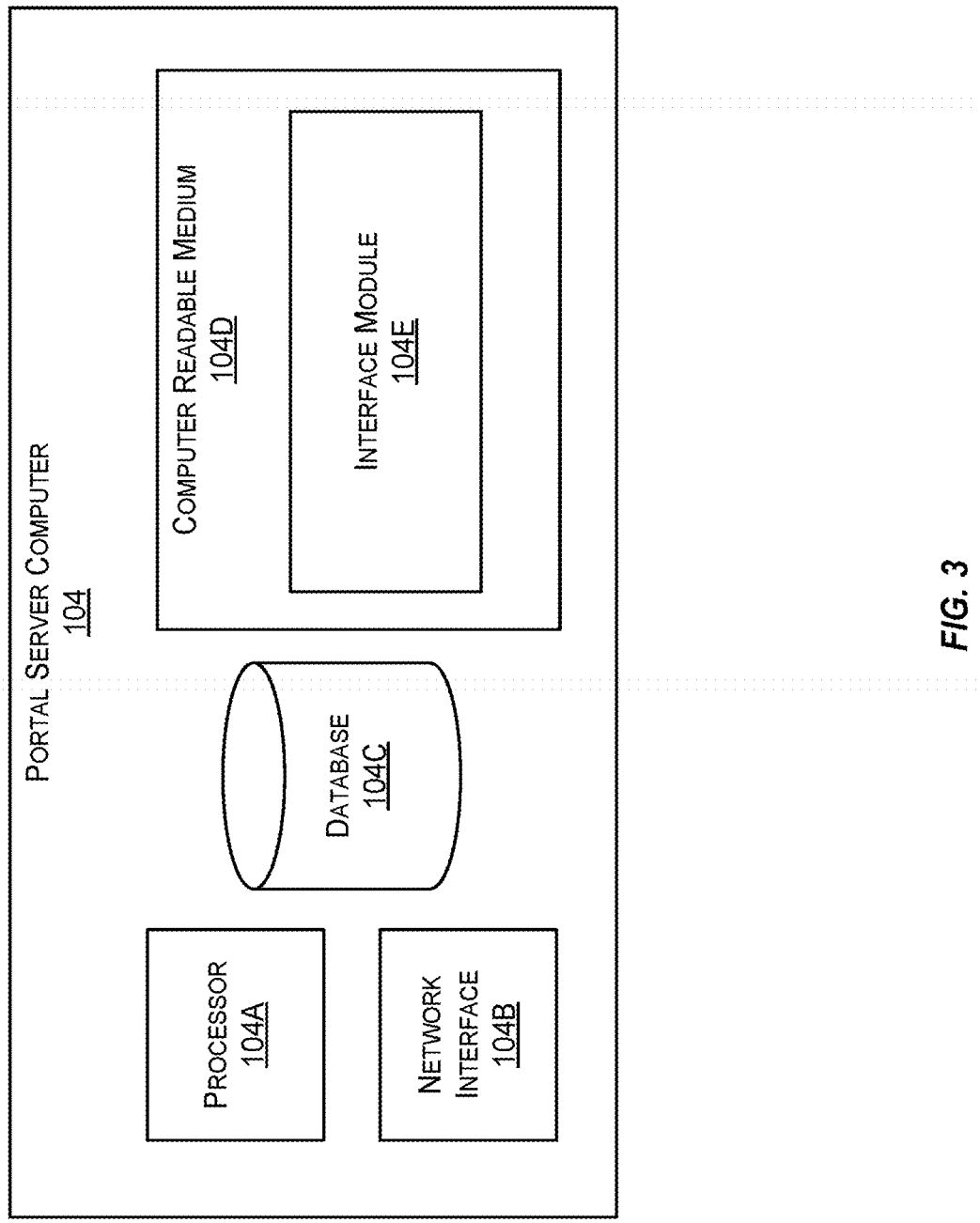
FIG. 3 shows a block diagram of an exemplary portal server computer according to an embodiment of the invention.

An example of the portal server computer 104, according to an embodiment of the invention, is shown in FIG. 3. The portal server computer 104 comprises a processor 104A, a network interface 104B, a database 104C, and a computer readable medium 104D.

The computer readable medium 104D may comprise an interface module 104E. The computer readable medium 104D may also comprise code, executable by the processor 104A for implementing the methods discussed herein.

The interface module 104E may comprise code that causes the processor 104A to provide one or more user interfaces associated with an authorizing entity (e.g., an Issuer). By way of example, the interface module 104E may comprise code that, when executed, causes the processor 104A to provide a webpage for creating a cryptocurrency account and/or displaying cryptocurrency account information of an existing cryptocurrency account. Information for providing the webpage may be stored and/or retrieved from database 104C by the processor 104A. The interface module 104E may be configured to cause the processor 104A to receive cryptocurrency account information such as a type of cryptocurrency, an amount of cryptocurrency to be associated with the cryptocurrency account, a cryptocurrency identifier associated with the user 103, a cryptocurrency network identifier (e.g., an identifier associated with a cryptocurrency network), or any suitable information for conducting a cryptocurrency transaction between the user and the authorizing entity within a cryptocurrency network. The interface module 104E may be configured to cause the processor 104A to provide any suitable cryptocurrency information to the wallet server computer 106 of FIG. 1.

Returning to FIG. 1, the wallet server computer 106 may be configured to create and/or manage a cryptocurrency account on behalf of the user. The cryptocurrency account may be associated with a payment account of an authorizing entity (e.g., an Issuer) and/or the payment device 109. The wallet server computer 106 may be configured to interact with a cryptocurrency network computer 108 to perform cryptocurrency transactions (e.g., a transfer of cryptocurrency from the user 103 to an authorizing entity/Issuer). The wallet server computer 106 may be configured to provide balance information associated with the cryptocurrency account, deduct cryptocurrency from the account, add cryptocurrency to the account, and any suitable transaction related to the cryptocurrency account.

Figure 4:
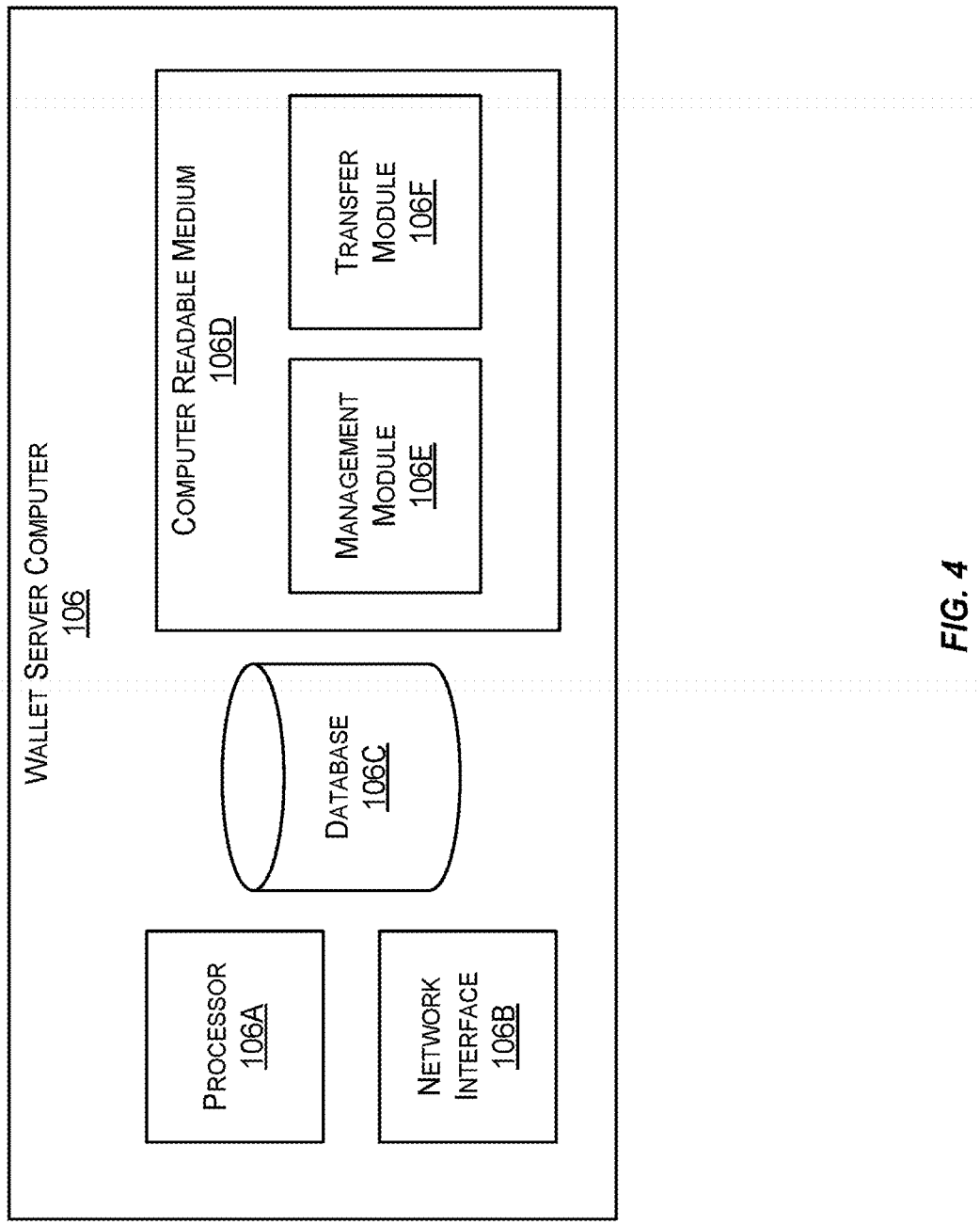
FIG. 4 shows a block diagram of an exemplary wallet server computer according to an embodiment of the invention.

An example of the wallet server computer 106, according to an embodiment of the invention, is shown in FIG. 4. The wallet server computer 106 may comprise a processor 106A, a network interface 106B, a database 106C, and a computer readable medium 106D.

The computer readable medium 106D may comprise a management module 106E and a transfer module 106F. The computer readable medium 106D may also comprise code, executable by the processor 106A for implementing the methods discussed herein.

The management module 106E may comprise code that causes the processor 106A to create and/or manage one or more cryptocurrency accounts on behalf of the user. By way of example, the management module 106E may be configured to cause the processor 106A to receive cryptocurrency account information (e.g., a type of cryptocurrency, an account balance of cryptocurrency, a cryptocurrency identifier associated with the user 103 and a cryptocurrency network (e.g., a Bitcoin network), a payment account number (e.g., a PAN) associated with the payment device 109, etc.) from the portal server computer 104 of FIGS. 1 and 3. In some examples, the management module 106E may comprise code that, when executed by the processor 106A, causes the processor 106A to store at least some portion of the cryptocurrency account information in the database 106C.

The transfer module 106F may comprise code that, when executed, causes the processor 106A to determine that the user 103 is requesting that an amount of pre-existing cryptocurrency be associated with the cryptocurrency account. Accordingly, the transfer module 106F may comprise code that causes the processor 106A to conduct a transaction with the cryptocurrency network computer 108 of FIG. 1. The transaction may cause the cryptocurrency network computer 108 to transfer the requested amount of cryptocurrency from the user 103 to an Issuer associated with the wallet server computer 106. Once transferred, the transfer module 106F may comprise code that causes the processor 106A to determine that the transfer was successful and to associate the amount of cryptocurrency transferred with the cryptocurrency account of the user 103. The cryptocurrency amount may be maintained in the database 106C in a record associated with a cryptocurrency account of the user 103.

Returning to FIG. 1, the processing network computer 116 may be configured to process transaction between the user 103 (e.g., utilizing the payment device 109) and the resource provider associated with the resource provider computer 112. The processing network computer 116 may be further configured to facilitate transactions between the authorizing entity computer 120 and the exchange computer 118. In some examples, the processing network computer 116 may be configured to conduct a settlement process between the transport computer associated with an Acquirer (e.g., a financial institution associated with the resource provider) and an Issuer (e.g., a financial institution associated with the user 103). In still further examples, the processing network computer 116 may be configured to conduct a separate settlement process between the Issuer and an exchange associated with the exchange computer 118.

As shown in FIG. 1, the processing network computer 116 may be disposed between the transport computer 114 and the authorizing entity computer 120 and between the authorizing entity computer 120 and the exchange computer 118. The processing network computer 116 may include data processing subsystems, networks, and operations used to support and deliver authorization services, exception file services, and clearing and settlement services. For example, the processing network computer 116 may comprise a server coupled to a network interface (e.g., by an external communication interface), and databases of information. The processing network computer 116 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The processing network computer 116 may use any suitable wired or wireless network, including the Internet.

Figure 5:
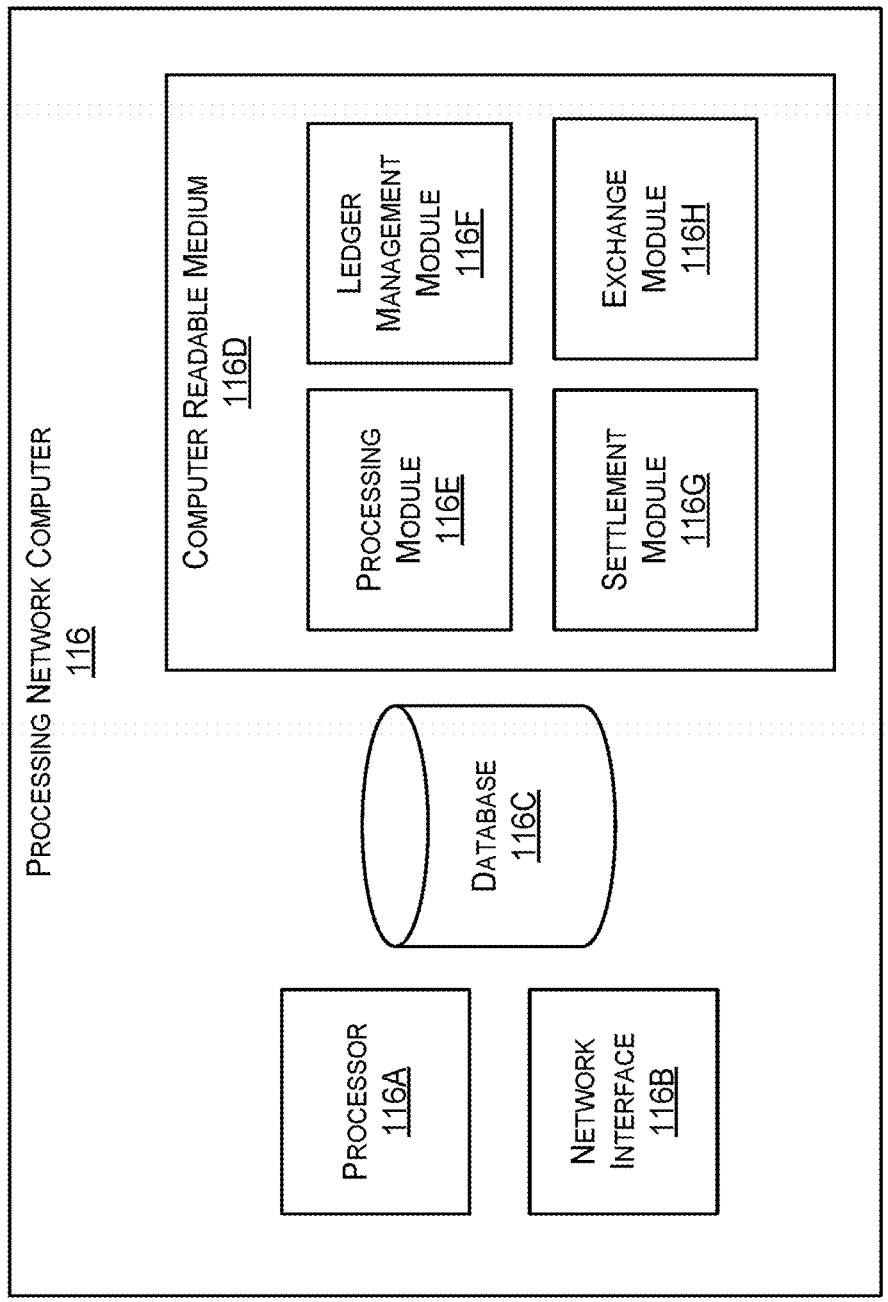
FIG. 5 shows a block diagram of an exemplary processing network computer according to an embodiment of the invention.

An example of the processing network computer 116, according to an embodiment of the invention, is shown in FIG. 5. The processing network computer 116 may comprise a processor 116A, a network interface 116B, a database 116C, and a computer readable medium 116D.

The computer readable medium 116D may comprise a 116E, a ledger management module 116F, and a settlement module 116G. The computer readable medium 106D may also comprise code, executable by the processor 106A for implementing the methods discussed herein.

The processing module 116E may comprise code that, when executed, causes the processor 116A to process transactions. While processing transactions, the processor 116A may receive and process authorization request messages and transmit authorization response messages associated with a transaction between the user 103 and a resource provider (e.g., a merchant). The resource provider may be associated with the resource provider computer 112. For example, the processing module 116E may contain logic that causes the processor 116A to forward, authorize, or reject authorization request messages for payment transactions.

The exchange module 116H may comprise code that, when executed, causes the processor 116A to obtain a current exchange rate from an exchange computer 118. The processor 116A may be configured to receive an exchange rate request message from the authorizing entity computer 120 and to convey the request to exchange computer 118. The processor 116A may further be configured to receive an exchange rate response message indicating a current exchange rate, and to convey that exchange rate response message to authorizing entity computer 120.

The ledger management module 116F may comprise code that, when executed, causes the processor 116A to store transaction records in the database 116C. For example, the database 116C may include a record of each completed transaction between a resource provider and an Issuer. The record may include transaction details (e.g. items purchased, amount, timestamp), resource provider information, user 103 information (e.g. a name, a phone number and/or other contact information, a payment token, an expiration date, etc.), and/or any other suitable information. The database 116C may additionally, or alternatively include a record of each completed transaction between an Issuer and an exchange. The exchange may be associated with the exchange computer 118 of FIG. 1. This record may include transaction details such as an issuer identifier, an exchange identifier, user information associated with the user 103, a fiat currency transaction amount, a cryptocurrency transaction amount, a transaction date/time, and/or any other suitable information. A ledger of transaction details for transaction between an Issuer and an exchange is provided in FIG. 6.

The ledger 600 of FIG. 6 includes individual records indicating individual transactions between a number of Issuers and a number of exchanges. The ledger, in this example, includes an issuer identifier 602 associated with an Issuer, an exchange identifier 604 associated with an exchange, a fiat currency transaction amount 606 (in this case, in U.S. Dollars), a cryptocurrency transaction amount 608 (e.g., in this case a Bitcoin amount), and a transaction time 610. By way of example only, the record 612 indicates that the exchange "Coin BB" conducted a transaction on behalf of the Issuer "DDS" on May 18, 2016 at approximately 12:02:13 in the morning (e.g., UTC time) that sold 0.51 Bitcoins of the Issuer for $1000 U.S. Dollars. It should be appreciated that the ledger 600 is meant to be illustrative in nature and is not intended to limit the scope of this disclosure. Other records for maintaining transaction data are contemplated.

Returning to FIG. 5, the settlement module 116G may be configured to aggregate transactions from the ledger(s) maintained by the ledger management module 116F in order to conduct one or more settlement processes between an Acquirer and Issuer and/or between an Issuer and an exchange. By way of example only, the settlement module 116G may comprise code that, when executed, causes the processor 116A to transmit data to authorizing entity computer 120 (or another computer operated on behalf of an Issuer) indicating how much Bitcoin the Issuer sold within a settlement window (e.g., a time range). The settlement module 116G may comprise code that, when executed, causes the processor 116A to transmit data to exchange computer 118 indicating how fiat currency currently held by the exchange is needing to be transferred to a particular Issuer.

Figure 7:
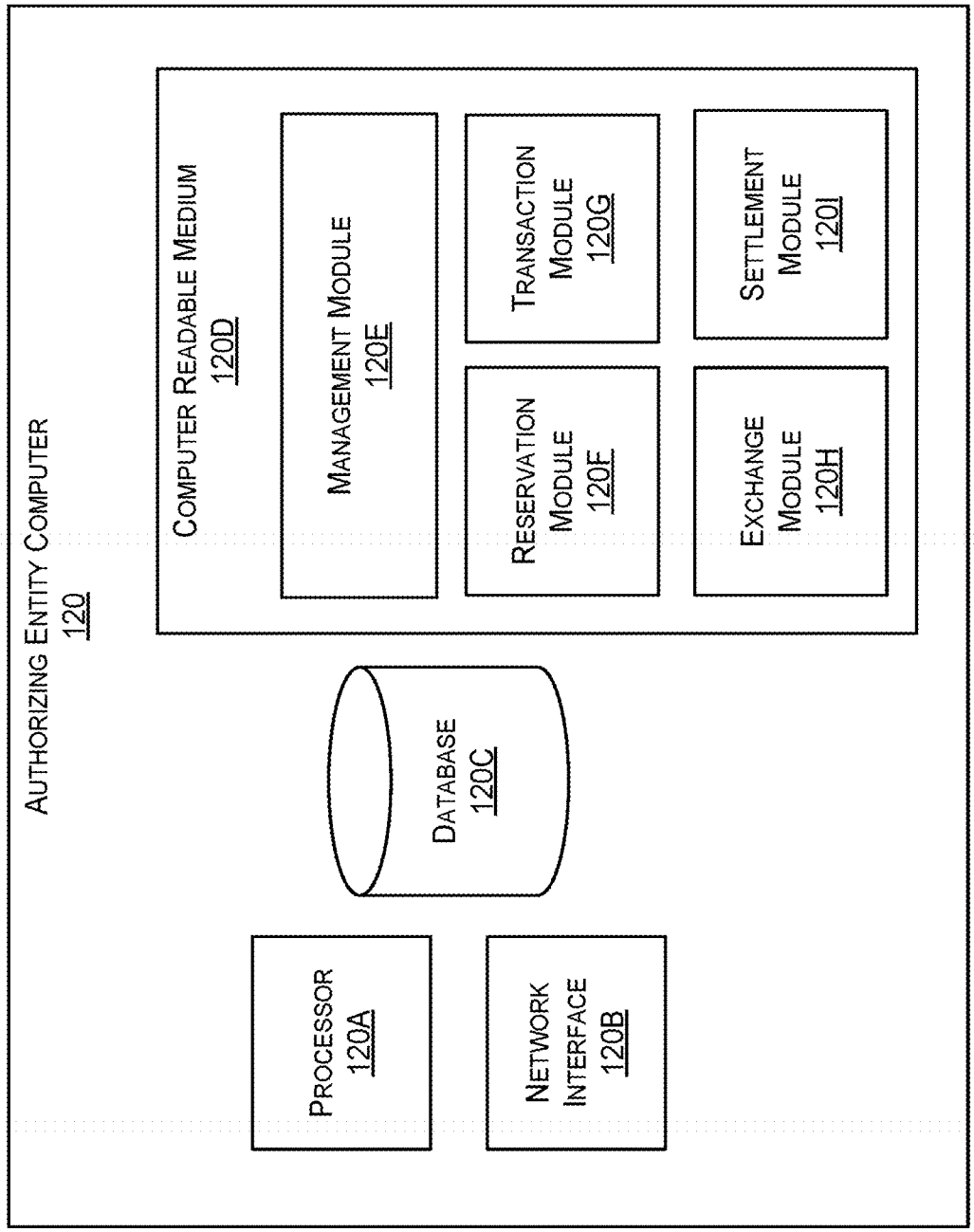
FIG. 7 shows a block diagram of an exemplary authorizing entity computer according to an embodiment of the invention.

An example of the authorizing entity computer 120, according to an embodiment of the invention, is shown in FIG. 7. The authorizing entity computer 120 may comprise a processor 120A, a network interface 120B, a database 120C, and a computer readable medium 120D.

The computer readable medium 120D may comprise a management module 120E, a reservation module 120F, a transaction module 120G, an exchange module 120H, and a settlement module 120I. The computer readable medium 120D may also comprise code, executable by the processor 120A for implementing the methods discussed herein.

The management module 120E may comprise code that, when executed, cause the processor 120A to issue and/or manage a payment account and an associated payment device 109 of the user 103.

The reservation module 120F may comprise code that, when executed, causes the processor 120A to determine an amount of cryptocurrency needed by the Issuer. The amount of cryptocurrency needed may, in some cases, depend on a number of issued debit cards that are associated with a cryptocurrency account and/or cryptocurrency amount limits associated with those issued debit cards. The reservation module 120F may comprise code that, when executed, causes the processor 120A to transmit a buy request message to exchange computer for the necessary cryptocurrency amount. The buy request message may indicate an amount of cryptocurrency to purchase, an amount of fiat currency to be exchanged for cryptocurrency, an acceptable buy price/price range, or the like. The reservation module 120F may comprise code that, when executed, causes the processor 120A to receive a buy response message. The buy response message may indicate a successful exchange of fiat currency for cryptocurrency or that the exchange was unsuccessful. The reservation module 120F may comprise code that, when executed, causes the processor 120A perform additional operations depending on the content of the buy response message.

The exchange module 120H may comprise code that, when executed, causes the processor 120A to obtain a current cryptocurrency exchange rate. For example, if the processor 120A has determined that a transaction is being conducted with a payment account that is associated with a cryptocurrency account, the processor 120A may be configured to request a current exchange rate of the cryptocurrency. The request may be transmitting in an exchange rate request message to processing network computer 116 and forwarded to exchange computer 118. The processor 120A may be configured to receive an exchange rate response message containing a current exchange rate of a particular type of cryptocurrency associated with the cryptocurrency account. The exchange rate response message may be provided by the exchange computer 118 to the authorizing entity computer 120 via the processing network computer 116. The current exchange rate may be provided to the transaction module 120G for calculations related to transaction processing.

The transaction module 120G may comprise code that, when executed, causes the processor 120A to process and/or authorize transactions. Before authorizing a transaction, the transaction module 120G may authenticate payment credentials received in the authorization request message, and check that there is available credit or funds in an associated payment account. The transaction module 120G may comprise code that, when executed, causes the processor 120A to determine that the payment account is associated with a cryptocurrency balance. That is, the transaction module 120G may comprise code that causes the processor 120A to request and receive a cryptocurrency amount corresponding to a balance of cryptocurrency associated with the user 103 and/or the payment account. The cryptocurrency balance may, in some embodiments, be provided by the wallet server computer 106 discussed above.

The transaction module 120G may comprise code that, when executed, causes the processor 120A to receive a current exchange rate. Using the current exchange rate and a transaction amount (in fiat currency) included in the received transaction, the transaction module 120G may be configured to cause the processor 120A to determine an equivalent amount of cryptocurrency that corresponds to the fiat currency of the transaction. The transaction module 120G may comprise code that causes the processor 120A to transmit a sell request message. The sell request message may indicate the amount of cryptocurrency the Issuer wishes to sell (e.g., the amount of cryptocurrency determined above), a sale price/price range, an Issuer identifier, or any suitable information that may be utilized by exchange computer 118 to sell cryptocurrency of the Issuer to a buyer participating in the exchange. The exchange module 120H may cause the processor 120A to receive a sell response message indicating that the sale was successful or unsuccessful. In some cases, the sell request message and/or the sell response message may be transmitted from the authorizing entity computer 120 to the exchange computer 118 via the processing network computer 116.

The transaction module 120G may comprise code that, when executed, causes the processor 120A to perform operations for transferring cryptocurrency to the exchange as part of a settlement process. For example, the processor 120A may receive a settlement message (e.g., from the processing network computer 116) that indicates an amount of cryptocurrency that was sold in a settlement time window. The processor 120A may then facilitate a transfer of cryptocurrency of the Issuer to the exchange. The transfer may be conducted with a cryptocurrency network computer such as cryptocurrency network computer 108 of FIG. 1.

Figure 8:
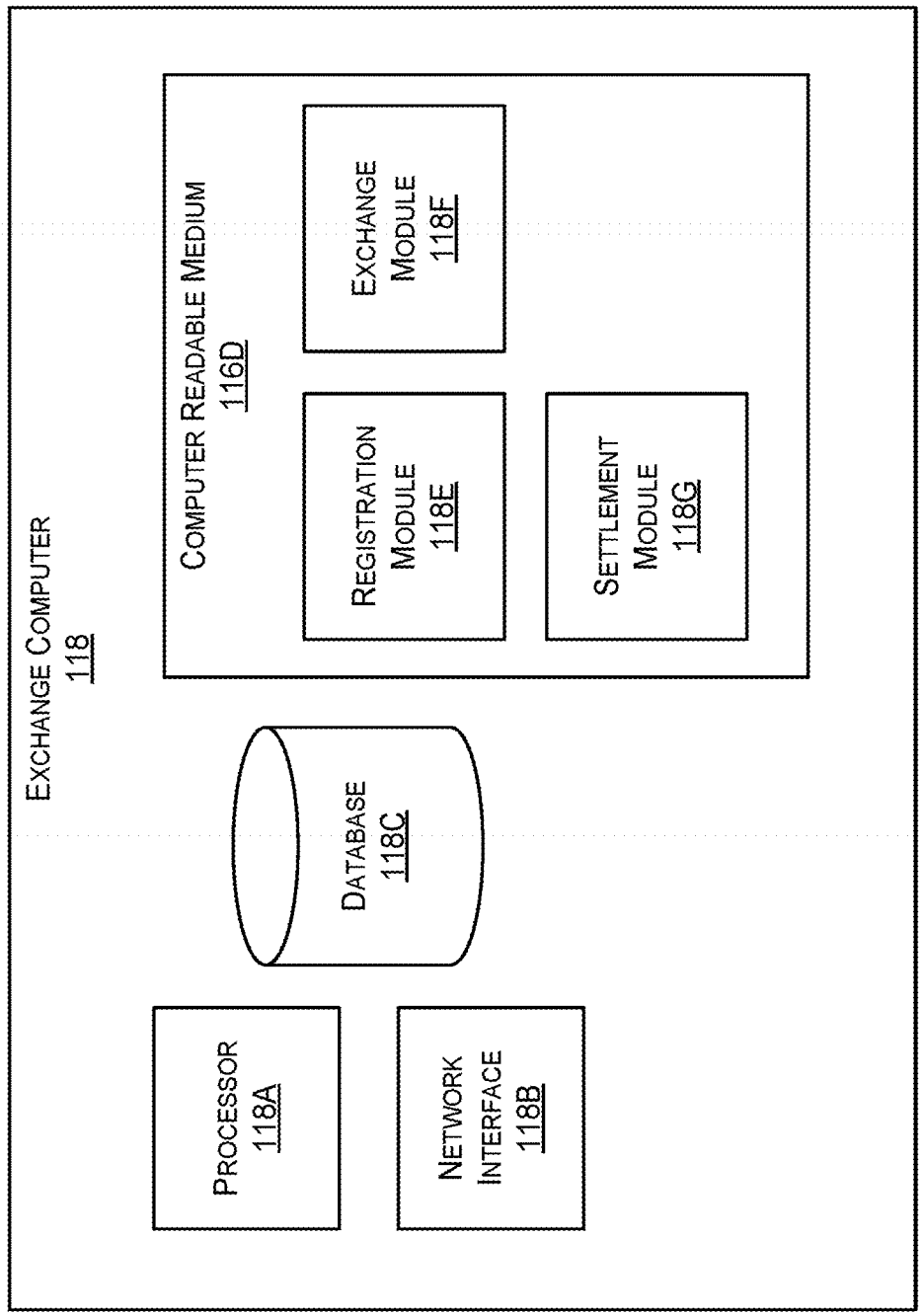
FIG. 8 shows a block diagram of an exemplary exchange computer according to an embodiment of the invention.

An example of the exchange computer 118, according to an embodiment of the invention, is shown in FIG. 8. The exchange computer 118 may comprise a processor 118A, a network interface 1186, a database 118C, and a computer readable medium 118D.

The computer readable medium 118D may comprise a registration module 118E, an exchange module 118F, and a settlement module 118G. The computer readable medium 118D may also comprise code, executable by the processor 118A for implementing the methods discussed herein.

The registration module 118E may comprise code that, when executed, causes the processor 118A to receive registration information associated with an exchange user (e.g., an Issuer, a cryptocurrency seller, etc.). The registration module 118E may cause the processor 118A to maintain an exchange account using the registration information. A record maintaining exchange account information may be stored in the database 118C. For example, the record may indicating a cryptocurrency amount, a fiat currency amount, past transaction information, etc. The exchange computer 118 may maintain exchange accounts for any suitable number of users, including one or more Issuers.

The exchange module 118F may comprise code that, when executed, causes the processor 118A to provide a current cryptocurrency exchange rate. For example, the processor 118A may be configured to receive an exchange rate request message. The exchange rate request message may be received from the processing network computer 116 and/or from the authorizing entity computer 120. The processor 118A may be configured to provide an exchange rate response message containing a current exchange rate of a particular type of cryptocurrency associated with the exchange rate request message. The exchange rate response message may be provided by the processor 118A to the authorizing entity computer 120 directly, or via the processing network computer 116.

The exchange module 118F may comprise code that, when executed, causes the processor 118A to receive a buy request message. The buy request message may be associated with an Issue and received directly from an authorizing entity computer 120 or the buy request message may be received via processing network computer 116. In some examples, the buy request message is associated with another participant of the exchange. A buy request message may indicate an exchange identifier associated with a buyer, an amount of cryptocurrency to purchase, an amount of fiat currency to be exchanged for cryptocurrency, an acceptable buy price/price range, or the like. Any suitable parameters may be included in the buy request message to facilitate a purchase of cryptocurrency for fiat currency.

The exchange module 118F may comprise code that, when executed, causes the processor 118A to receive a sell request message. The sell request message may be received directly from an authorizing entity computer 120, or the sell request message may be received via processing network computer 116. In some examples, the sell request message is associated with another participant of the exchange. The sell request message may indicate an exchange identifier associated with a seller, an amount of cryptocurrency to sell, an acceptable sale price/price range in fiat currency, or the like. Any suitable parameters may be included in the sell request message to facilitate a sale of cryptocurrency for fiat currency.

The exchange module 118F may comprise code that, when executed by the processor 118A, performs operations comprising matching a buy request to a sell request of one or more users of the exchange. If a matching sell request is found, the exchange module 118F may facilitate a transfer of cryptocurrency from the seller's exchange account to an exchange account of the buyer and a transfer of fiat currency from the buyer's exchange account to an exchange account of the seller. The exchange module 118F may comprise code that, when executed, causes the processor 118A to transmit a buy response message. The buy response message may indicate a successful exchange of fiat currency for cryptocurrency or that the exchange was unsuccessful.

The settlement module 118G may comprise code that, when executed, causes the processor 118A to perform operations for transferring fiat currency to an Issuer as part of a settlement process. For example, the processor 118A may receive a settlement message (e.g., from the processing network computer 116) that indicates an amount of fiat currency that was obtained via one or more cryptocurrency sales by the Issuer within a settlement time window. The processor 118A may then facilitate a transfer of fiat currency to the Issuer and may update account information (e.g., a fiat currency balance) of the Issuer's account within the exchange. The transfer may be conducted with conventional methods of fiat currency transfer.

FIGS. 9-12 are directed to methods 900-1200. The steps shown in the methods 900-1200 may be performed sequentially or in any suitable order in embodiments of the invention. In some embodiments, one or more of the steps may be optional. The various messages described below for the methods 900-1200 may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

Figure 9:
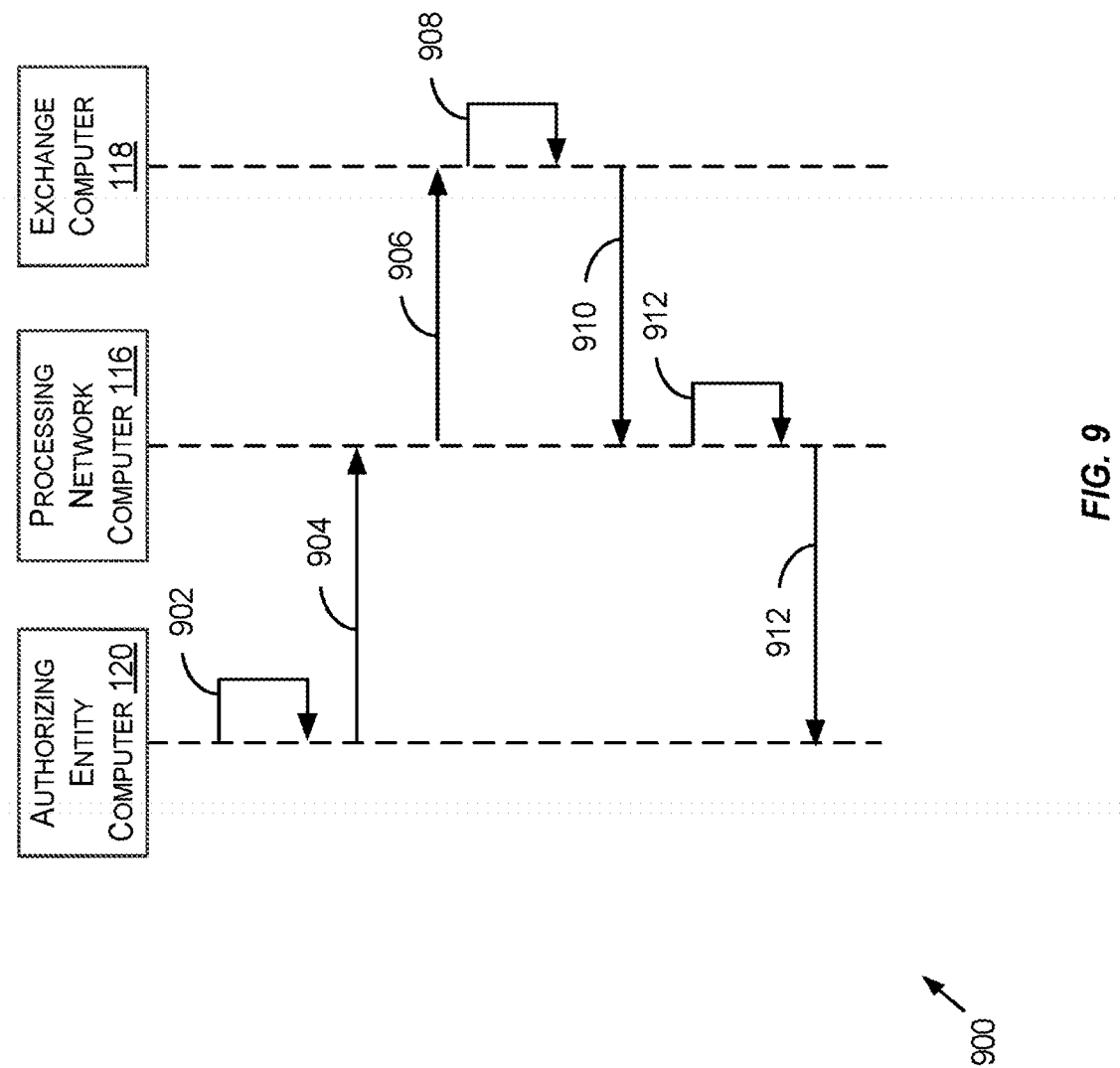
FIG. 9 shows a flow diagram illustrating a method for performing a cryptocurrency exchange according to an embodiment of the invention.

FIG. 9 shows a flow diagram illustrating a method 900 for performing a cryptocurrency exchange according to an embodiment of the invention. It assumed, for the purposes of this example, that an Issuer associated with the authorizing entity computer 120 has already registered and funded (e.g., with fiat currency) an exchange account managed by the exchange computer 118. The method may begin at 902, where a component of authorizing entity computer 120 (e.g., the reservation module 120F) may cause the processor 120A to determine a cryptocurrency amount to purchase. In some examples, the cryptocurrency amount may be determined based on a number of cryptocurrency related debit cards issued by the Issuer associated with the authorizing entity computer 120. By way of example, the Issuer may issue particular debit cards (referred to as a Crypto Debit Card) with which it will allow a cryptocurrency account to be associated. In some examples, the Issuer may allow any suitable number and/or types of cryptocurrency accounts to be associated with the Crypto Debit Card. Thus, the Crypto Debit Card may be associated with a user's bank account that is managed by the Issuer on behalf of the user. The Crypto Debit Card may further be associated with one or more cryptocurrency accounts managed by the wallet provider computer 106 as discussed above. In some embodiments, the Issuer may limit the Crypto Debit Cards to each having no more than a particular threshold amount of cryptocurrency associated with the Crypto Debit Card at any given time. Thus, the reservation module 120F of the authorizing entity computer 120 may determine an amount of cryptocurrency to be purchased based at least in part on the number of Crypto Debit Cards issued and/or the corresponding cryptocurrency limits associated with such cards.

The method 900 may proceed to 904, where the reservation module 120F of the authorizing entity computer 120 may cause the processor 120A to transmit a buy request message to the processing network computer 116. A component of the processing network computer 116 (e.g., the processing module 116E) may cause the processor 116A to transmit the buy request message to the exchange computer 118. The buy request message may include a fiat currency amount to be exchange for an amount of cryptocurrency, an identifier associated with the Issuer, a buy price/price range, or the like.

The method 900 may proceed to 906, where the processing module 116E (or another suitable component of the processing network computer 116) may transmit the buy request message to the exchange computer 118. A component of the exchange computer 118 (e.g., the exchange module 118F) may be configured to cause the processor 118A to receive and process the buy request message.

The method 900 may proceed to 908, where a component of the exchange computer 118 (e.g., the exchange module 118F or another suitable component of the exchange computer 118) may search account information of at least some portion of exchange participants to determine if a sell request message has been received that matches the buy request message. Said another way, the exchange computer 118 may determine whether there a seller that wishes to sell some amount of cryptocurrency for the price/price range for which the Issuer wishes to buy. If a match is determined, the exchange computer 118 may facilitate a transfer of fiat currency from the Issuer's exchange account to the seller's exchange account and a transfer of the cryptocurrency of the seller to the Issuer's exchange account.

The method 900 may proceed to 910, where a component of the exchange computer 118 (e.g., the exchange module 118F) may transmit a buy response message to the processing network computer 116.

The method 900 may proceed to 912, where a component of the processing network computer 116 (e.g., the ledger management module 116F) may be configured to cause the processor 118A to receive and process the buy response message. In at least one embodiment, the processing network computer 116 may record the transaction associated with the buy response message in a ledger (e.g., the ledger 600 of FIG. 6).

The method 900 may proceed to 914, where a component of the processing network computer 116 (e.g., the ledger management module 116F) may transmit the buy response message to the authorizing entity computer 120. The buy response message may indicate that the purchase of the cryptocurrency associated with the original buy request message was successful or unsuccessful. If the buy response message indicates that the sale was unsuccessful, the authorizing entity computer 120 may perform addition operations to attempt the purchase one or more additional times.

Figure 10:
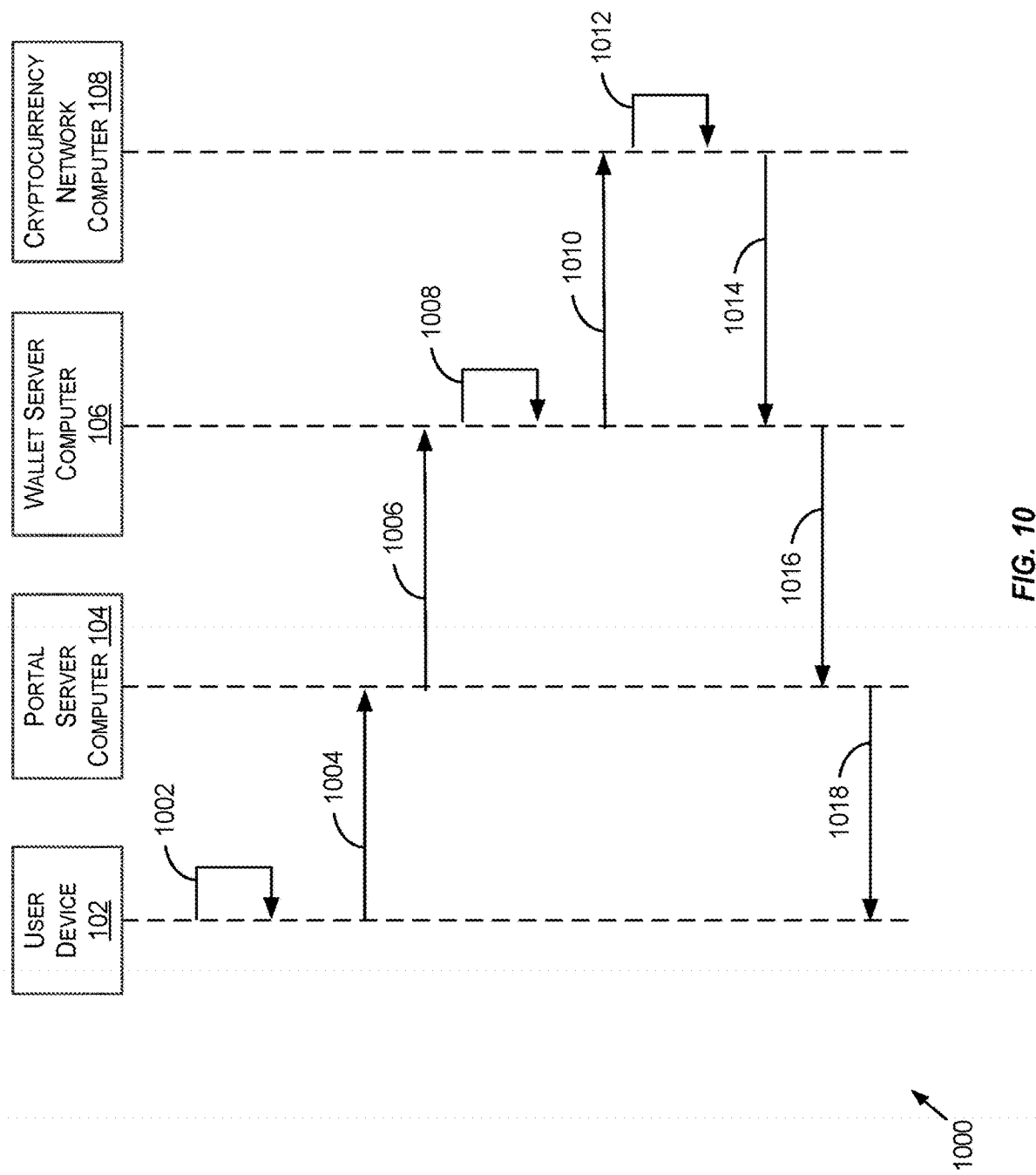
FIG. 10 shows a flow diagram illustrating a method for funding a wallet account with cryptocurrency utilizing a cryptocurrency network according to an embodiment of the invention.

FIG. 10 shows a flow diagram illustrating a method 1000 for funding a wallet account with cryptocurrency utilizing a cryptocurrency network according to an embodiment of the invention. The method 1000 may begin at 1002, where a user device 102 may be utilized to access a user interface provided by a component of the portal server computer 104 (e.g., interface module 104E of FIG. 3). The user interface may be accessed via an application (e.g., the application 102A of FIG. 1) operating on the user device 102. The application may be associated with the wallet server computer 106, the authorizing entity associated with the wallet server computer 106, or the application may be, for example, a browsing application configured to access the Internet and/or webpage provided by the portal server computer 104. The user interface may be configured to collect information associated with the user.

The method may proceed to 1004, where the information collected via the user interface is provided to the portal server computer 104. The collected information may include a payment account number, a user identifier, user information such as a name, address, phone number associated with the user, an cryptocurrency account identifier associated with the user within a cryptocurrency network managed by the cryptocurrency network computer 108, an amount of pre-existing cryptocurrency, a type of cryptocurrency account to be associated with the user, or any suitable combination of the above.

The method may proceed to 1006, where the portal server computer 104 may forward the information collected via the user interface to the wallet server computer 106.

The method may proceed to 1008, where a component of the wallet server computer 106 (e.g., the management module 106E) may create a cryptocurrency account and/or associate the cryptocurrency account with the user and/or the payment account number. The cryptocurrency account information may be stored in a record accessible to the wallet server computer 106 (e.g., the database 106C).

The method may proceed to 1010, where a component of the wallet server computer 106 (e.g., the transfer module 106F) may execute one or more operations to request a cryptocurrency transaction within a cryptocurrency network in which the cryptocurrency network computer 108 operates. By way of example only, the cryptocurrency network computer 108 may be configured to participate in a Bitcoin network.

The method may proceed to 1012, where the cryptocurrency network computer 108 may execute one or more operations to transfer the requested amount of cryptocurrency (e.g., Bitcoin) from the user 103 to the Issuer associated with the portal server computer 104 and wallet server computer 106.

When the transfer of cryptocurrency has been completed the method may proceed to 1014, where the cryptocurrency network computer 108 provides an indication that the transfer was successful to the wallet server computer 106. Upon receipt, the wallet server computer 106 may update the record of the cryptocurrency account to indicate the current balance of cryptocurrency (e.g., the cryptocurrency amount that was just transferred from the user to the Issuer).

The method may proceed to 1016, where the wallet server computer 106 provides the updated cryptocurrency account information to the portal server computer 104. The portal server computer 104 may update one or more user interfaces to provide the updated cryptocurrency account information to the user device 102 at 1018.

Figure 11:
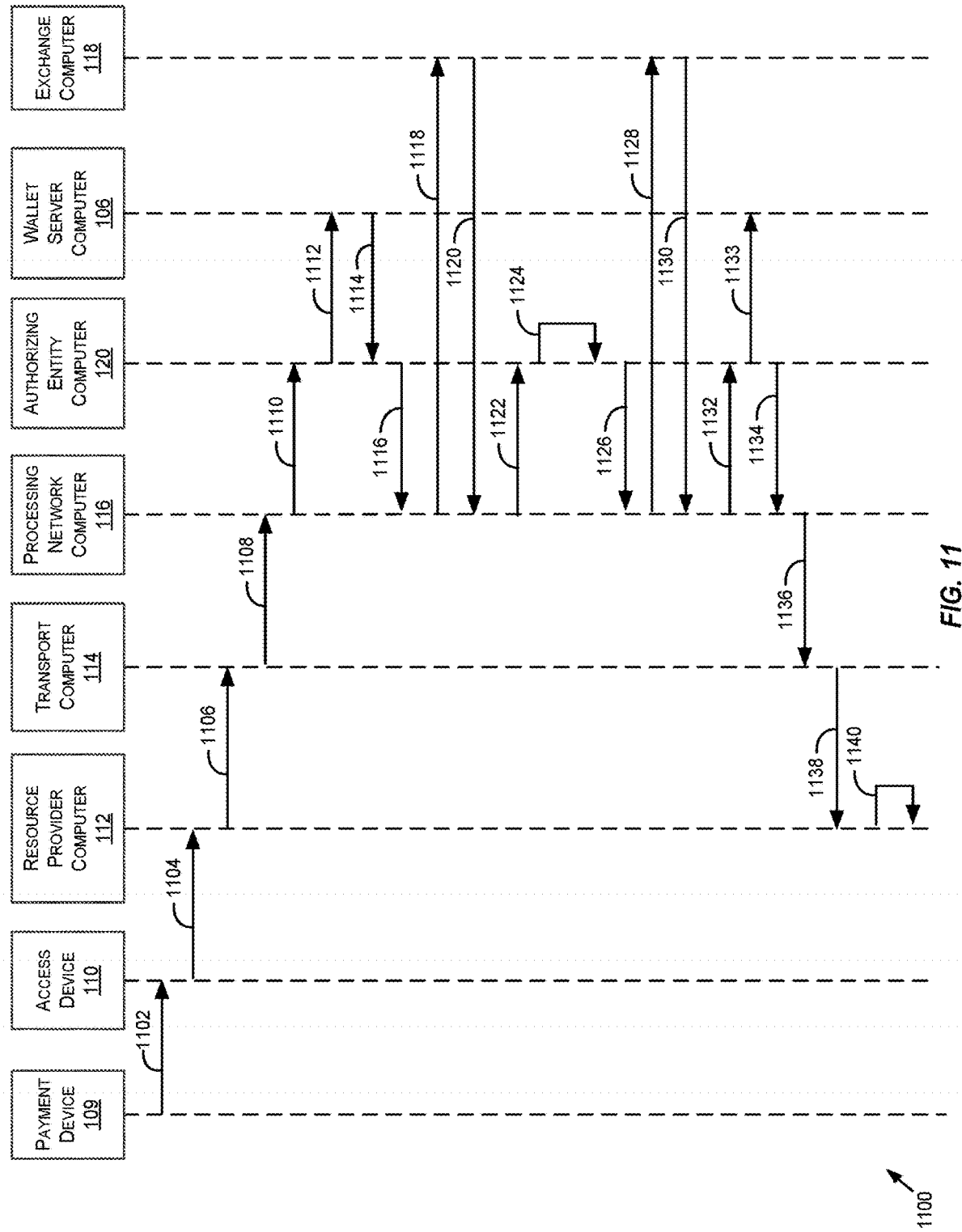
FIG. 11 shows a flow diagram illustrating a method for performing a transaction utilizing cryptocurrency according to an embodiment of the invention.

FIG. 11 shows a flow diagram illustrating a method 1100 for performing a transaction utilizing cryptocurrency according to an embodiment of the invention. The method 1100 describes a process in which a user 103 may be able to use the payment device 109 to conduct a transaction with a resource provider (e.g., a merchant) associated with the resource provider computer 112. The resource provider may engage in transactions, sell goods or services, or provide access to goods or services to the user 103. The resource provider may accept multiple forms of payment (e.g. the payment device 109) and may use multiple tools to conduct different types of transactions. For example, the resource provider may operate a physical store and use the access device 110 (e.g., a point of sale device) for in-person transactions. The resource provider may also sell goods and/or services via a website, and may accept payments over the Internet.

The payment device 109 (e.g., a debit card) may store information associated with the user 103 and/or payment information. For example, the payment device 109 may store payment credentials as well as personal information such as a name, address, email address, phone number, or any other suitable user identification information of the user 103. The payment device 109 may provide this information to the access device 110 during a transaction.

The payment device 109 may be in the form of a card. For example, the payment device 109 may comprise a plastic substrate. In some embodiments, a contactless element for interfacing with an access device may be present on, or embedded within, the plastic substrate. A magnetic stripe may also or alternatively be on the plastic substrate. User information such as an account number, expiration date, and/or a user name may be printed or embossed on the card. In some embodiments, the payment device 109 may comprise a microprocessor and/or memory chips with user data stored in them.

The method may begin at 1102, where the payment device 109 is presented to an access device 110 (e.g., a point-of-sale device). By way of example, the user 103 may swipe a payment device 109 (e.g., a Crypto Debit Card) at a point-of-sale terminal within a merchant's store or enter in an payment account information associated with the payment device 109 via a website hosted on behalf of the merchant. In either scenario, payment account information associated with the payment device 109 may be transmitted to the access device 110.

At 1104, the access device 110 may transmit transaction information (e.g. items purchased, transaction amount in fiat currency, etc.), merchant information (e.g. merchant name, location, etc.), payment information (e.g., payment account number), and any other suitable information.

At 1106, the resource provider computer 112 may submit an authorization request message for the transaction to the transport computer 114 (which may be an acquirer computer. The transport computer 114 may be associated with the resource provider computer 112, and may manage authorization requests on behalf of the resource provider computer 112. The authorization request message may include transaction information (e.g. items purchased, transaction amount in fiat currency, etc.), merchant information (e.g. merchant name, location, etc.), payment information (e.g., payment account number), and any other suitable information.

At 1108, the transport computer 114 may forward the authorization request message to the processing network computer 116. At 1110, the processing network computer 116 may forward the authorization request message to the authorizing entity computer 120.

At 1112, a component (e.g., the transaction module 120G) of the authorizing entity computer 120 may transmit a balance request message to the wallet server computer 106. As discussed above, the wallet server computer 106 may manage one or more cryptocurrency accounts of the Issuer. The wallet server computer 106 may retrieve (e.g., from the database 106C) the cryptocurrency account balance associated with cryptocurrency account associated with the user 103. The wallet server computer 106 may provide the cryptocurrency account balance associated with the user 103 at 1114.

At 1116, a component (e.g., the exchange module 120H) of the authorizing entity computer 120 may transmit an exchange rate request message to the processing network computer 116. The exchange rate request message may indicate, among other things, a particular type of cryptocurrency for which an exchange rate is requested.

At 1118, a component (e.g., the exchange module 116H) of the processing network computer 116 may forward the exchange rate request message to the exchange computer 118. The exchange computer 118 may then retrieve the requested exchange rate and transmit the exchange rate in an exchange rate response message back to the processing network computer 116 at 1120. The processing network computer may forward the exchange rate response message to the authorizing entity computer 120 at 1122.

At 1124, a component (e.g., the exchange module 120H) of the authorizing entity computer 120 may calculate, based on the exchange rate received at 1122, an equivalent amount of cryptocurrency corresponding to the transaction amount (e.g., in fiat currency) of the transaction information received in the authorization request message received at 1110. In some examples, the authorizing entity computer 120 may add a transaction fee to the equivalent amount of cryptocurrency to cover any risk of exchange rate fluctuation.

At 1126, a component (e.g., the exchange module 120H) of the authorizing entity computer 120 may transmit a sell request message to the processing network computer 116. At 1128, the processing network computer 116 may forward the sell request message to the exchange computer 118. The sell request message may specify an amount of cryptocurrency (e.g., the cryptocurrency amount calculated at 1124 that is equivalent to the transaction amount of the authorization request message). In some examples, the sell request message may indicate an acceptable fluctuation amount (e.g., 2% up or down) that defines an acceptable price range for the sale. Upon receipt, the exchange computer 118 may determine if there are one or more buy requests within the exchange that match the sell request message parameters. That is, the exchange computer 118 may determine if there are the buyers within the exchange that are willing to purchase at least some portion of the cryptocurrency amount indicated in the sell request message for the price/price range indicated in the sell request message. If there are one or more users that may purchase a total amount corresponding to the cryptocurrency amount indicated in the sell request, the exchange computer 118 may facilitate one or more transactions within the exchange to transfer fiat currency of the buyer(s) to the exchange account of the Issuer and the cryptocurrency of the Issuer to the exchange account of the buyer(s).

At 1130, a component (e.g., the exchange module 118F) of the exchange computer 118 may transmit a sell response message to the processing network computer 116. Upon receipt, or at another suitable time, a component (e.g., the ledger management module 116F) of the processing network computer 116 may log the information contained in the sell response message within a ledger (e.g., the ledger 600 of FIG. 6). A component (e.g., the exchange module 116H) of the processing network computer 116 may forward the sell response message to the authorizing entity computer 120 at 1132. If the sale was successful (as indicated in the sell request message), a component (e.g., the exchange module 120H) of the authorizing entity computer 120 may transmit a request to the wallet server computer 106 to deduct an appropriate amount of cryptocurrency from the user's cryptocurrency account. For example, a component (e.g., the management module 106E) of the wallet server computer 106 may cause equivalent amount of cryptocurrency calculated at 1124 to be deducted from the user's cryptocurrency account as well as, in some cases, a transaction fee (e.g., 2% of the transaction amount, 4% of the transaction amount, a flat fee, etc.).

At 1132, a component (e.g., the transaction module 120G) of the authorizing entity computer 120 may authorize or reject the transaction based on the sell response message received at 1130. For example, if the sell response message indicates the sale was successful, the authorizing entity computer 120 may send an authorization response message that indicates the transaction initiated at 1102 has been authorized. If the sale was unsuccessful, the authorizing entity computer 120 may send an authorization response message that indicates that the transaction was denied.

At 1134, the authorizing entity computer 120 may send an authorization response indicating whether or not the transaction was authorized to the processing network computer 116.

At 1136, the processing network computer 116 may forward the authorization response message to the transport computer 114. At 1138, the transport computer 114 may forward the authorization response message to the resource provider computer 112.

At 1140, the resource provider computer 112 may release the purchased goods and/or services to the user 103 based on the authorization response message.

Figure 12:
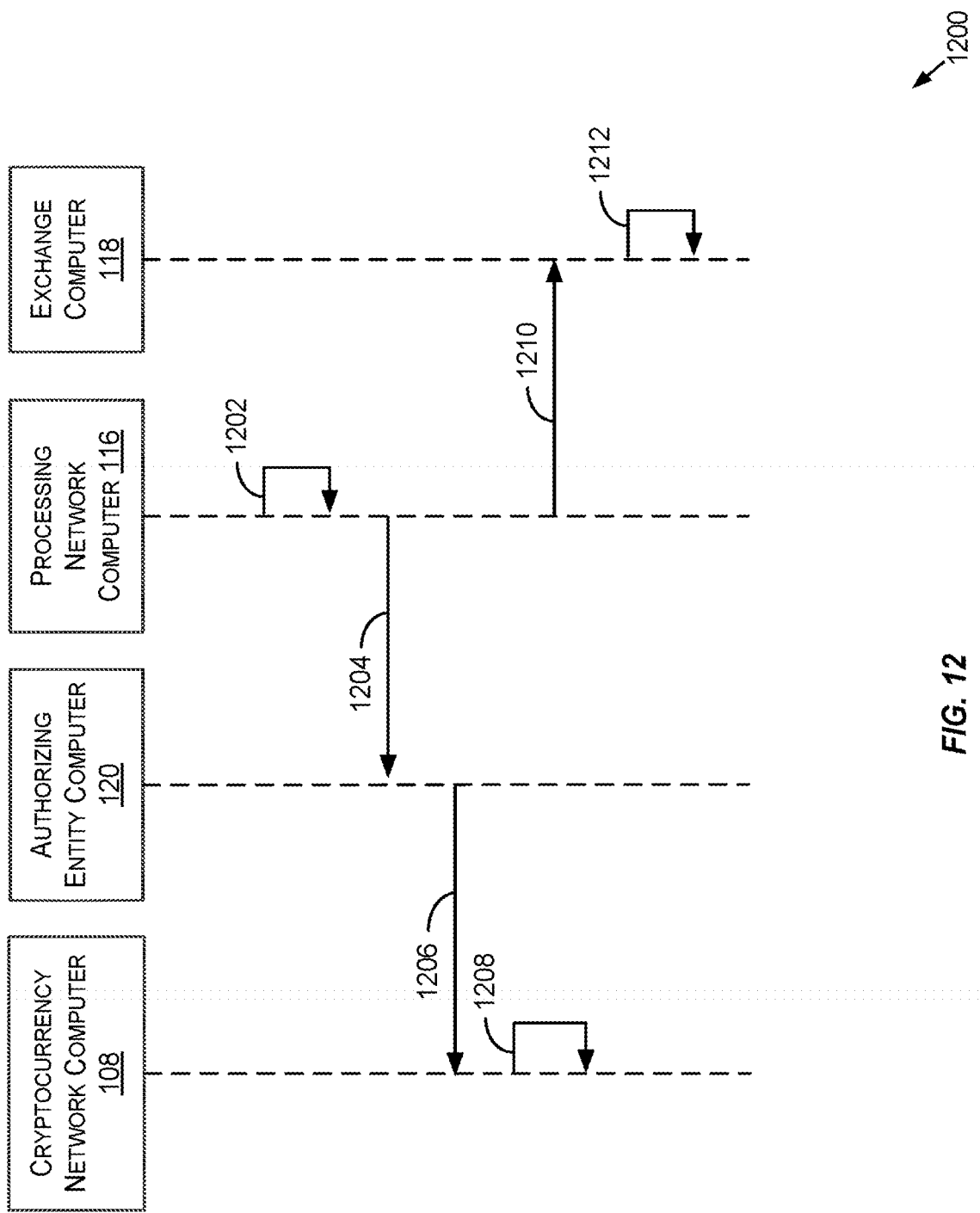
FIG. 12 shows a flow diagram illustrating a method for cryptocurrency settlement according to an embodiment of the invention.

FIG. 12 shows a flow diagram illustrating a method 1200 for cryptocurrency settlement according to an embodiment of the invention. The method 1200 may begin at 1202, where a component (e.g., the settlement module 116G) of processing network computer 116 may cause the cryptocurrency transactions occurring within a settlement time window to be aggregate to determine aggregated transaction amounts. The aggregation may utilize a ledger (e.g., the ledger 600 of FIG. 6). In at least one example, the processing network computer 116 may aggregate all cryptocurrency transactions for associated with individual Issuers. Referring to the ledger 600 of FIG. 6, the processing network computer 116 may determine that, based on the transactions included in the ledger 600, that the Issue "DDS" has sold 3.61 Bitcoins utilizing the exchange "Coin BB." Additionally, the processing network computer 116 may determine, based on the ledger 600, that the exchange "Coin BB" owes the Issuer "DDS" $7000 U.S. Dollars for the transactions within the settlement time window.

The method may proceed to 1204, where a component (e.g., the settlement module 116G) of the processing network computer 116 may send information indicating the amount of Bitcoin sold within the settlement time window to the authorizing entity computer 120. Upon receipt of the information, or at another suitable time, a component (e.g., the settlement module 120I) of the authorizing entity may perform one or more operations to conduct a transfer on a cryptocurrency network.

For example, the authorizing entity computer 120 (via the settlement module 120I) may be configured to send a transaction request to the cryptocurrency network computer 108 at 1206. The transaction request may indicate that the authorizing entity computer 120 requests that 3.61 Bitcoins are transferred from the Issuer associated with the authorizing entity computer 120 to the Exchange associated with the exchange computer 118.

The method may proceed to 1208, where the cryptocurrency network computer 108 may perform one or more operations to transfer 3.61 Bitcoin from the Issuer to the exchange. By way of example, the cryptocurrency network computer 1210 may record in a blockchain ledger associated with the cryptocurrency network in which the cryptocurrency network computer 108 participates, a transfer of the 3.61 from the Issuer to the exchange. The exchange computer 118 may be notified of the transfer and, at any suitable time, the exchange computer 118 may transfer the 3.61 Bitcoins to the Issuer's exchange account. Thus, the Bitcoins that were previously sold to conduct the cryptocurrency transaction of FIG. 11 may be replaced and the Issuer's account replenished for future cryptocurrency transactions.

The method may proceed to 1210, where the processing network computer 116 may transmit a settlement message to the exchange computer 118. The settlement message may indicate a settlement amount (e.g., $7000) based on the aggregation performed at 1202.

The method may proceed to 1212, where a component (e.g., the settlement module 118G) of the exchange computer 118 may perform one or more operations to conduct a conventional transaction to transfer the settlement amount ($7000) to the Issuer.

Embodiments of the invention have a number of advantages. For example, utilizing the techniques discussed above, the user 103 can conduct transactions for goods and services in near real-time. If the user 103 were to attempt to exchange cryptocurrency with a merchant utilizing conventional techniques for transferring cryptocurrency, both the user and the merchant might have to wait a significant period of time (e.g., 30 minutes) before the transaction could be confirmed by the cryptocurrency network. By requiring the user to essential fund a cryptocurrency account in advance, and by utilizing a cryptocurrency account of the Issuer within an exchange, the process described above can be conducted in near real time. Making the techniques described herein for performing transaction utilizing cryptocurrency much more practical than conventional systems as the overall latency experienced during the performance of the transactions discussed herein is significantly shorter.

Additionally, to transfer cryptocurrency for goods and services using conventional techniques would require the user and the merchant to have a pre-existing cryptocurrency account on the cryptocurrency network. However, by utilizing the techniques described here, the merchant is not required to have any interaction or knowledge of the cryptocurrency network. To the merchant and the acquirer, the processes described here are no different, from these entity's points of view, than a traditional authorization process associated with a transaction involving fiat currency. The utilizing of the cryptocurrency as payment is managed between the Issuer, processing network computer, and the exchange any may be completely transparent to the user, the merchant, and/or the acquirer.

Any of the computing devices described herein may be an example of a computer system that may be used to implement any of the entities or components described above. The subsystems of such a computer system may be are interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method, comprising:
receiving, by a processing network computer, an authorization request message for authorizing a transaction for a resource, the transaction being conducted between a user device, which uses a cryptocurrency and is operated by a user, and a resource provider computer, which uses fiat currency and is operated by a resource provider, wherein the authorization request message includes a transaction amount for the transaction as a fiat currency amount for the resource associated with the transaction and indicates a use of a cryptocurrency wallet account managed by an authorizing entity and associated with the user device, to be used in the transaction, the cryptocurrency wallet account being associated with a particular type of cryptocurrency among a plurality of types of cryptocurrency;
transmitting, by the processing network computer to an authorizing entity computer over a network, the authorization request message including a request to authorize the transaction, wherein, having received the authorization request message, the authorizing entity computer thereafter transmits, to the processing network computer, a cryptocurrency exchange rate request;
in response to the cryptocurrency exchange rate request being received, obtaining, by the processing network computer, a current cryptocurrency exchange rate between a fiat currency and the particular type of the cryptocurrency associated with the cryptocurrency wallet account, wherein the authorizing entity computer thereafter calculates a cryptocurrency amount for the resource associated with the transaction by converting the fiat currency amount provided in the authorization request message based on the current cryptocurrency exchange rate;
receiving, by the processing network computer from the authorizing entity computer over the network, a sell request message indicating a sell request for the calculated cryptocurrency amount;
transmitting, by the processing network computer to an exchange computer over the network, the sell request message including the calculated cryptocurrency amount to be sold from a cryptocurrency exchange account of the authorizing entity that is managed by the exchange computer, wherein the exchange computer is configured to facilitate, over the network, a sale of the cryptocurrency amount for the fiat currency amount on behalf of the authorizing entity on an online exchange associated with the exchange computer, and generate a sell response message that is responsive to the sell request message and includes an indication of a successful sale of the cryptocurrency amount for the fiat currency amount, wherein the exchange computer manages the online exchange that facilitates purchases and sales of cryptocurrency and operates separately from a cryptocurrency network of computers that jointly manage a blockchain of transactions;
maintaining, by the processing network computer in a database of the processing network computer, an electronic ledger comprising transaction records corresponding to a plurality of transactions completed between the authorizing entity computer and the online exchange associated with the exchange computer during a time period;
receiving, by the processing network computer from the exchange computer over the network, the sell response message including an indication of the successful sale of the cryptocurrency amount for the fiat currency amount on behalf of the authorizing entity;
in response to the sell response message including the indication of the successful sale, recording, by the processing network computer, information related to the sell response message in the electronic ledger maintained in the database, the information comprising the cryptocurrency amount; and
transmitting, by the processing network computer to the authorizing entity computer over the network, the sell response message, wherein, upon receiving the sell response message from the processing network computer, the authorizing entity computer transmits, to the processing network computer, an authorization response message that indicates that the transaction is authorized,
wherein the authorizing entity computer thereafter causes the cryptocurrency network of computers to update the blockchain of transactions to reflect the sale of the cryptocurrency amount.

2. The method of claim 1, further comprising:
executing, by the processing network computer, a settlement process for facilitating settlement between the exchange computer and the authorizing entity computer.

3. The method of claim 2, wherein the settlement process comprises:
determining aggregated transaction amounts for transactions occurring within a settlement time window between the authorizing entity computer and the exchange computer, wherein determining the aggregated transaction amounts utilizes the electronic ledger maintained by the processing network computer.

4. The method of claim 3, wherein the settlement process further comprises:
transmitting, by the processing network computer to the authorizing entity computer, a first settlement message indicating a total amount of cryptocurrency sold by the authorizing entity associated with the authorizing entity computer, the total amount of cryptocurrency being determined based on the aggregated transaction amounts; and
transmitting, by the processing network computer to the exchange computer, a second settlement message indicating a total fiat currency amount held by the exchange computer that is to be transferred to the authorizing entity associated with the authorizing entity computer, the total fiat currency amount being determined based on the aggregated transaction amounts.

5. The method of claim 4, wherein receipt of the first settlement message causes the authorizing entity computer to perform one or more operations to conduct a transfer of an amount of cryptocurrency to an exchange associated with the exchange computer, the transfer being conducted utilizing a cryptocurrency network computer associated with the cryptocurrency.

6. The method of claim 4, wherein receipt of the second settlement message causes the exchange computer to perform one or more operations to conduct a transfer of the total fiat currency amount from an exchange associated with the exchange computer to the authorizing entity associated with the authorizing entity computer.

7. The method of claim 1, wherein the authorization response message is further transmitted to the resource provider computer.

8. The method of claim 1, wherein the authorization request message is received from the resource provider computer via a transport computer.

9. The method of claim 1, wherein the authorization request message comprises an account number.

10. The method of claim 1, further comprising:
upon receiving the authorization response message indicating that the transaction is authorized, forwarding, by the processing network computer, the authorization response message to the resource provider computer, wherein receiving the authorization response message causes the resource provider computer to release the resource.

11. The method of claim 1, wherein the processing network computer is connected between the authorizing entity computer and the exchange computer, and includes a server coupled to an interface of the network.

12. The method of claim 1, further comprising:
sending, by the processing network computer to the authorizing entity computer, a message including an aggregate cryptocurrency amount that was recorded in the electronic ledger during the time period,
wherein receiving the message by the authorizing entity computer causes the authorizing entity computer to forward the message to one of cryptocurrency network computers within the cryptocurrency network of computers for updating the blockchain of transactions that is jointly managed by the cryptocurrency network of computers, to reflect the aggregate cryptocurrency amount sold by the authorizing entity computer during the time period.

13. The method of claim 1, wherein utilizing the cryptocurrency associated with the authorizing entity enables the transaction to be performed by the user using the cryptocurrency wallet account in less time than if the transaction were to be performed by transferring the cryptocurrency amount between the user device and the resource provider computer utilizing the cryptocurrency network of computers that jointly manage the blockchain of transactions.

14. A computing system comprising:
a processor; and
a non-transitory computer readable medium comprising code, executable by the processor to implement a method including:
receiving, by a processing network computer of the computing system, an authorization request message for authorizing a transaction for a resource, the transaction being conducted between a user device, which uses a cryptocurrency and is operated by a user, and a resource provider computer, which uses fiat currency and is operated by a resource provider, wherein the authorization request message includes a transaction amount for the transaction as a fiat currency amount for the resource associated with the transaction and indicates a use of a cryptocurrency wallet account managed by an authorizing entity and associated with the user device, to be used in the transaction, the cryptocurrency wallet account being associated with a particular type of cryptocurrency among a plurality of types of cryptocurrency;
transmitting, by the processing network computer to an authorizing entity computer over a network, the authorization request message including a request to authorize the transaction, wherein, having received the authorization request message, the authorizing entity computer thereafter transmits, to the processing network computer, a cryptocurrency exchange rate request;
in response to the cryptocurrency exchange rate request being received, obtaining, by the processing network computer, a current cryptocurrency exchange rate between a fiat currency and the particular type of the cryptocurrency associated with the cryptocurrency wallet account, wherein the authorizing entity computer thereafter calculates a cryptocurrency amount for the resource associated with the transaction by converting the fiat currency amount provided in the authorization request message based on the current cryptocurrency exchange rate;
receiving, by the processing network computer from the authorizing entity computer over the network, a sell request message indicating a sell request for the calculated cryptocurrency amount;
transmitting, by the processing network computer to an exchange computer over the network, the sell request message including the calculated cryptocurrency amount to be sold from a cryptocurrency exchange account of the authorizing entity that is managed by the exchange computer, wherein the exchange computer is configured to facilitate, over the network, sale of the cryptocurrency amount for the fiat currency amount on behalf of the authorizing entity on an online exchange associated with the exchange computer, and generate a sell response message that is responsive to the sell request message and includes an indication of a successful sale of the cryptocurrency amount for the fiat currency amount, wherein the exchange computer manages the online exchange that facilitates purchases and sales of cryptocurrency and operates separately from a cryptocurrency network of computers that jointly manage a blockchain of transactions;
maintaining, by the processing network computer in a database of the processing network computer, an electronic ledger comprising transaction records corresponding to a plurality of transactions completed between the authorizing entity computer and the online exchange associated with the exchange computer during a time period;
receiving, by the processing network computer from the exchange computer over the network, the sell response message including an indication of the successful sale of the cryptocurrency amount for the fiat currency amount on behalf of the authorizing entity;
in response to the sell response message including the indication of the successful sale, recording, by the processing network computer, information related to the sell response message in the electronic ledger maintained in the database, the information comprising the cryptocurrency amount; and
transmitting, by the processing network computer to the authorizing entity computer over the network, the sell response message, wherein, upon receiving the sell response message from the processing network computer, the authorizing entity computer transmits, to the processing network computer, an authorization response message that indicates that the transaction is authorized, wherein the authorizing entity computer thereafter causes the cryptocurrency network of computers to update the blockchain of transactions to reflect the sale of the cryptocurrency amount.

15. The computing system of claim 14, wherein the method further includes:

executing a settlement process for facilitating settlement between the exchange computer and the authorizing entity computer.

16. The computing system of claim 15, wherein the executing the settlement process further includes:

determining aggregated transaction amounts for transactions occurring within a settlement time window between the authorizing entity computer and the exchange computer, wherein determining the aggregated transaction amounts utilizes the electronic ledger maintained by the processing network computer.

17. The computing system of claim 16, wherein the executing the settlement process further includes:

transmitting, to the authorizing entity computer, a first settlement message indicating a total amount of cryptocurrency sold by the authorizing entity associated with the authorizing entity computer, the total amount of cryptocurrency being determined based on the aggregated transaction amounts; and transmitting, to the exchange computer, a second settlement message indicating a total fiat currency amount held by the exchange computer that is to be transferred to the authorizing entity associated with the authorizing entity computer, the total fiat currency amount being determined based on the aggregated transaction amounts.

18. The computing system of claim 17, wherein receipt of the first settlement message causes the authorizing entity computer to perform one or more operations to conduct a transfer of an amount of cryptocurrency to an exchange associated with the exchange computer, the transfer being conducted utilizing a cryptocurrency network computer associated with the cryptocurrency.

19. The computing system of claim 17, wherein receipt of the second settlement message causes the exchange computer to perform one or more operations to conduct a transfer of the total fiat currency amount from an exchange associated with the exchange computer to the authorizing entity associated with the authorizing entity computer.

20. The computing system of claim 14, wherein the authorization request message is received from the resource provider computer via a transport computer.

* * * * *